United States Patent
Bak et al.

(10) Patent No.: US 9,183,832 B2
(45) Date of Patent: Nov. 10, 2015

(54) DISPLAY APPARATUS AND METHOD FOR EXECUTING LINK AND METHOD FOR RECOGNIZING VOICE THEREOF

(75) Inventors: Eun-sang Bak, Ansan-si (KR); Hyun-kyu Yun, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 278 days.

(21) Appl. No.: 13/478,799

(22) Filed: May 23, 2012

(65) Prior Publication Data
US 2012/0313849 A1 Dec. 13, 2012

(30) Foreign Application Priority Data

Jun. 7, 2011 (KR) .................. 10-2011-0054722
Nov. 16, 2011 (KR) .................. 10-2011-0119412

(51) Int. Cl.
G09G 5/00 (2006.01)
G10L 15/08 (2006.01)
G06F 3/16 (2006.01)

(52) U.S. Cl.
CPC ................ G10L 15/08 (2013.01); G06F 3/167 (2013.01)

(58) Field of Classification Search
CPC ........... G06F 3/017; G06F 3/013; G06F 3/01; G06F 3/005; G06F 3/011; G06F 3/014; G06F 3/016; G06F 3/0346; G06F 3/041; G06F 3/03; G06F 3/012; G06F 3/04815; G06F 3/0485; G06F 3/0488; G06F 3/04886
USPC .......... 345/156, 781, 784; 704/275, 231, 251, 704/260, 3, 10, 271, 255, 270.1, 270, 233; 701/211; 434/317; 707/10
See application file for complete search history.

(56) References Cited

U.S. PATENT DOCUMENTS

| | | | | |
|---|---|---|---|---|
| 6,092,043 | A * | 7/2000 | Squires et al. | 704/251 |
| 6,101,472 | A | 8/2000 | Giangarra et al. | |
| 6,615,176 | B2 | 9/2003 | Lewis et al. | |
| 6,725,197 | B1 * | 4/2004 | Wuppermann et al. | 704/251 |
| 2002/0091529 | A1 * | 7/2002 | Whitham | 704/275 |

(Continued)

FOREIGN PATENT DOCUMENTS

| | | |
|---|---|---|
| GB | 2467451 A | 8/2010 |
| KR | 20010015932 A | 3/2001 |

(Continued)

OTHER PUBLICATIONS

Communication, dated Oct. 1, 2012, issued by the European Patent Office in counterpart European Application No. 12169225.5.
International Search Report dated Dec. 26, 2012 from the International Searching Authority in counterpart international application No. PCT/KR/2012/004190.

(Continued)

*Primary Examiner* — Olga Merkoulova
(74) *Attorney, Agent, or Firm* — Sughrue Mion, PLLC

(57) ABSTRACT

A display apparatus and a method for executing a link and a method for recognizing a voice thereof are provided. The method for executing a link of the display apparatus includes displaying a user interface, determining a text included in a link included in the user interface, displaying the text determined in the link to be distinguished from other texts, recognizing a voice input from a user, and if the voice uttered by the user matches the text determined in the link, executing the link associated with the matching text. Accordingly, possibility of misrecognition of a voice input by the user is reduced, and the user controls a display apparatus using more exact voice recognition.

60 Claims, 13 Drawing Sheets

(56) References Cited

U.S. PATENT DOCUMENTS

| | | |
|---|---|---|
| 2005/0027538 A1 | 2/2005 | Halonen et al. |
| 2006/0271838 A1* | 11/2006 | Carro .......................... 715/501.1 |
| 2007/0008366 A1 | 1/2007 | Nojima et al. |
| 2011/0209041 A1* | 8/2011 | Haq .............................. 715/208 |

FOREIGN PATENT DOCUMENTS

| | | |
|---|---|---|
| WO | 2004090713 A1 | 10/2004 |
| WO | 2006081835 A1 | 8/2006 |

OTHER PUBLICATIONS

Written Opinion dated Dec. 26, 2012 from the International Searching Authority in counterpart international application No. PCT/KR/2012/004190.

Communication dated Nov. 21, 2014 issued by Mexican Institute of Industrial Property in counterpart Mexican Patent Application No. MX/a/2013/014171.

Communication dated Feb. 20, 2015 issued by Mexican Institute of Industrial Property in counterpart Mexican Patent Application No. MX/a/2013/014171.

* cited by examiner

DISPLAY APPARATUS AND METHOD FOR EXECUTING LINK AND METHOD FOR RECOGNIZING VOICE THEREOF

CROSS-REFERENCE TO RELATED APPLICATION

This application claims priority from Korean Patent Application Nos. 10-2011-0054722, filed on Jun. 7, 2011 and 10-2011-0119412, filed on Nov. 16, 2011, in the Korean Intellectual Property Office, the disclosures of which is incorporated herein by reference in its entirety.

BACKGROUND

1. Field

Methods and apparatuses consistent with exemplary embodiments relate to a display apparatus and a method for executing a link and a method for recognizing a voice thereof, and more particularly, to a display apparatus which recognizes a user's voice and executes a control command, and a method for executing a link and a method for recognizing a voice thereof.

2. Description of the Related Art

As recent display apparatuses have become multi-functionalized and have been advanced, various input methods to control the display apparatuses have been developed. For example, an input method using a mouse, an input method using a touch pad, and an input method using a motion sensing remote controller have been developed.

In particular, among these various input methods, a voice recognition method, which controls a display apparatus by recognizing a user's voice, is being developed.

However, recognizing the voice spoken by the user may not yield satisfactory results due to the fact that people have different oral structures and different pronunciations.

That is, if a voice recognition apparatus misrecognizes a voice spoken by a user, there is a problem that the user does not control the display apparatus in a manner that he/she wants.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a display apparatus which prevents misrecognition of a voice spoken by a user and thus is able to perceive the voice more exactly, and a method for executing a link and a method for recognizing a voice thereof.

According to an aspect of an exemplary embodiment, there is provided a voice recognition method for a display apparatus, the method comprising: determining a first text extracted from a first display item; displaying the first text so as to distinguish the first text from other texts; recognizing a voice input from a user; determining if the recognized voice corresponds to the first text, and selecting the first display item in response to a determination that the recognized voiceinput corresponds to the first text.

The first text may be a partial text included in the first display item or a related text of the first display item.

The first display item may be a link.

The first text may be displayed to be distinguished from the other texts using color, font, thickness, or underline.

The first text may be displayed to be distinguished from the other texts using a visual indication (e.g. an icon) informing that voice recognition is possible.

The display item may be a result of a search conducted by a search engine.

The first display item may be a hyperlink and selecting the hyperlink may display the webpage linked to the display item.

The determining may determine the first text such that the first text may not overlap (i.e. share common words) with a second text extracted from another display item.

The method may further comprise, if the recognized voice input does not match the first text, informing voice misrecognition by displaying the recognized voice input.

The other texts may comprise texts except for the first text among the texts included in the first display item.

The first text may be determined by an order that words included in the first display item are listed.

The first text may be determined by an analysis of meanings of the words included in the first display item.

The first text may be processed by sound so as to be distinguished from the other texts.

The selecting the first display item may comprise displaying a screen resulting from performing a function associated with the first display item.

According to an aspect of another exemplary embodiment, there is provided a display apparatus comprising: a display unit which displays a first display item; a text determination unit which extracts a first text corresponding to the display item; a voice recognition unit which recognizes a voice input from a user; and a controller which controls the display unit to display the first text so as to distinguish the first text from other texts, determines if the recognized voice corresponds to the first text, and controls the display unit to select the first display item in response to a determination that the recognized voice input corresponds to the first text.

The first text may comprise at least one of a partial text included in the first display item and a related text of the display item.

The first display item may comprise a link.

The first text may be processed to be distinguished from the other texts using color, font, thickness, or underline.

The first text may be displayed to be distinguished from the other texts using a visual indication (e.g., an icon) informing that voice recognition is possible.

The display item may comprise a result of a search conducted by a search engine.

The first display item may be a hyperlink and selecting the first display item may comprise displaying a web page linked to the first display item.

The text determination unit may determine the first text such that the first text may not overlap (i.e. share common words) with a second text extracted from a second display item.

If the recognized voice input does not match the first text, the controller may inform the user of the voice misrecognition by displaying the recognized voice input to the user.

The other texts may comprise texts except for the first text among the texts included in the first display item.

The first text may be determined by an order that words included in the first display item are listed.

The first text may be determined by an analysis of meanings of words included in the first display item.

The first text may be processed by sound to be distinguished from the other texts.

The selecting the first display item may comprise displaying a screen resulting from performing a function associated with the first display item.

According to an aspect of still another exemplary embodiment, there is provided a method for executing a link of a display apparatus, the method comprising: displaying a user interface; extracting a text included in a first link included in the user interface; displaying the text extracted from the first link to be distinguished from other texts; recognizing a voice input from a user; and, if the recognized voice input by the user matches the text extracted from the first link, executing a first link comprising the matching text.

The extracting may comprise extracting texts such that the first text of the link may not overlap (i.e. share common words) with a second text extracted from a second link.

The displaying may comprise displaying the extracted text to be distinguished from the other texts using color, font, thickness, or underline.

The displaying may comprise displaying a visual indication (e.g. an icon) indicating that voice recognition is possible on one side of the extracted text.

The method may further comprise, if a link displayed as an image is included in the user interface, displaying a specific text on one side of the first link displayed as the image, and the executing may comprise, if the recognized voice input from the user matches the specific text, executing a first link comprising the matching specific text.

The recognizing a voice input may comprise receiving and recognizing voice information of the user by an external voice recognition apparatus comprising a microphone.

According to an aspect of still another exemplary embodiment, there is provided a display apparatus comprising: a display unit which displays a user interface; a text extraction unit which extracts a text included in a first link included in the user interface; a voice recognition unit which recognizes a voice input from a user; and a controller which controls the display unit to display the text extracted from the first link to be distinguished from other texts, and, if the recognized voice input from the user matches the text extracted from the first link, executes the first link.

The text extraction unit may extract texts such that the text of the first link may not overlap (i.e. share common words) with a text extracted from a second link.

The controller may control the display unit to display the extracted text to be distinguished from the other texts using color, font, thickness, or underline.

The controller may control the display unit to display a visual indication (e.g., an icon) comprising information indicating that voice recognition is possible on one side of the extracted text.

If a first link displayed as an image is included in the user interface, the controller may control the display unit to display a specific text on one side of the first link displayed as the image, and, if the recognized voice input from the user matches the specific text, may execute the first link.

The voice recognition unit may receive and recognize voice information of the user recognized by an external voice recognition apparatus comprising a microphone.

According to an aspect of still another exemplary embodiment, there is provided a method for recognizing a voice of a display apparatus, the method comprising: recognizing a voice input from a user; if the voice input by the user is recognized, searching a text matching the recognized voice input; displaying the matched text and a text similar to the matched text on one side of the matched text; and selecting one of the matched text and the similar text according to additional voice recognition from the user.

The selecting may comprise, if there is no additional voice recognition from the user within a predetermined time, selecting the matched text.

The displaying may comprise displaying an identification text on one side of the similar text, and the identification text may be different from the matched text in pronunciation.

The selecting may comprise, if a voice additionally recognized from the user matches the identification text, selecting the similar text.

The displaying may further comprise detecting a similar text associated with the matched text from a database in which similar texts are associated with matched text and recorded, and the database in which the similar texts are associated with matched texts and recorded may be updatable.

According to an aspect of still another exemplary embodiment, there is provided a display apparatus comprising: a display unit; a voice recognition unit which recognizes a voice uttered by a user; and a controller which, if the voice uttered by the user is recognized, searches a text matching with the uttered voice, controls the display unit to display the searched text and a text similar to the searched text on one side of the searched text, and selects one of the searched text and the similar text according to additional voice recognition from the user.

If there is no additional voice recognition from the user within a predetermined time, the controller may select the searched text.

The controller may control the display unit to display a tag comprising an identification text on one side of the similar text, and the identification text may be different from the searched text in pronunciation.

If a voice additionally recognized from the user matches the identification text, the controller may select the similar text.

The display apparatus may further comprise a database in which similar texts are matched and recorded, and the database in which the similar texts are matched and recorded may be updatable.

According to an aspect of still another exemplary embodiment, there is provided a method for recognizing a voice of a display apparatus, the method comprising: determining a first text corresponding to a first display item; displaying the first text by being coupled to the first display item so as to distinguish the first display item from a second display item; recognizing a voice input from a user; and if the recognized voice input corresponds to the first text, selecting the first display item.

The first text may comprise a number, a letter of the alphabet, a Roman character, a partial text included in the first display item, or a related text of the first display item.

The first display item may comprise a menu item, application icon, and link.

The first text may be surrounded by a circle or a box.

The first display item may comprise a result of a search conducted by a search engine.

The screen applicable to the first display item may comprise a user interface including the first display item.

The determining may determine the first text such that the first text may not overlap (i.e. share common words) with a second text coupled to the second display item.

The selecting the first display item may comprise displaying a screen resulted from performing a function associated with the first display item if it is judged that the recognized voice input matches the first text.

According to an aspect of still another exemplary embodiment, there is provided a display apparatus comprising: a display unit which displays a first display item; a text determination unit which determines a first text corresponding to the display item; a voice recognition unit which recognizes a voice input from a user; and a controller which displays the first text by being coupled to the first display item so as to distinguish the first display item from a second display item, and, if the recognized voice input corresponds to the first text, controls the display unit to select the first display item.

The first text may comprise a number, a letter of the alphabet, a Roman character, a partial text included in the first display item, or a related text of the first display item.

The first display item may comprise a menu item, an application icon, or a link.

The first text may be surrounded by a circle or box.

The first display item may comprise a result of a search conducted by a search engine.

The first display item may comprise a hyperlink and selecting the first display item may comprise displaying a web page linked to the first display item.

The determining may determine the first text such that the first text may not overlap (i.e. share common words) with a second text coupled to the second display item.

The selecting the first display item may comprise displaying a screen resulted from performing an operation associated with the first display item.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
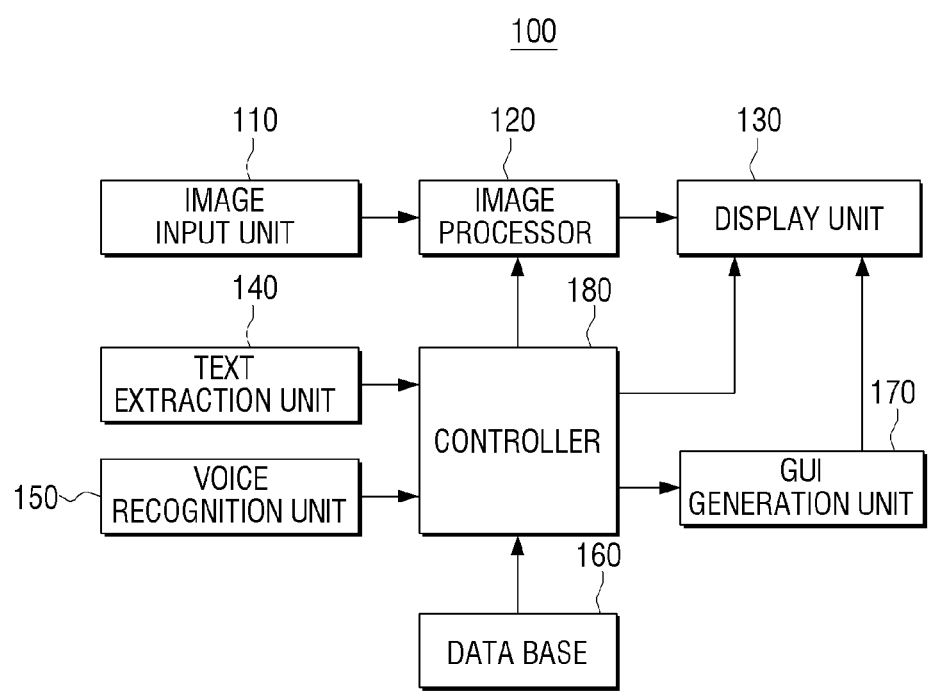
FIG. 1 is a block diagram illustrating a display apparatus according to exemplary embodiments.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a display apparatus 100 according to exemplary embodiments. As shown in FIG. 1, the display apparatus 100 comprises an image input unit 110, an image processor 120, a display unit 130, a text determination unit 140, a voice recognition unit 150, a database 160, a graphic user interface (GUI) generation unit 170, and a controller 180.

The image input unit 110 comprises one or more input terminals to receive audio and video signals. For example, input unit 110 may receive a component video signal, a super video home system (S-VHS) video signal, and a composite video signal, an S-Video signal, a Video Graphics Array (VGA) signal, a Digital Visual Interface (DVI) video signal, etc. The input unit 110 may receive video signals from an external device (such as a video player, a digital versatile disk (DVD) player, a set-top box, or personal computer), through a network (such as a local area network, a wide area network, or the Internet), from a broadcast signal (such as a satellite, cable or terrestrial broadcast), etc. The input unit 110 also receives audio signals corresponding to the video signals.

The image processor 120 performs signal-processing such as video decoding, video scaling, and audio decoding with respect to the video signals and the audio signals input through the image input unit 110 and a communication unit (not shown). Also, the image processor 120 outputs the processed video signals to the display unit 130.

The display unit 130 displays an image output from the image processor 120. Also, the display unit 130 may display a user interface loaded through the communication unit (not shown). Also, the display unit 130 may add a graphical user interface generated by the GUI generation unit 170 to the image and display both the image and the GUI.

The text determination unit 140 determines a text corresponding to a display item which is being displayed (e.g. icon, link, application and the like). For example, the text determination unit 140 may determine a text by extracting a text included in the display item and by coupling the text to a pre-stored text.

More specifically, the text determination unit 140 parses text information included in the link, thereby extracting the text. The text may be determined by an order that words included in the display item are listed and by an analysis of meanings of the words included in the display item. For example, the extracted text may be a meaningful keyword of the text information included in the display item. The meaningful keyword may be extracted in various ways such as comparing it with a library dictionary stored in the database 160 or extracting a first word of the extracted text.

The text determined by the text determination unit 140 may be at least one of a partial text included in the display item and a related text of the display item.

If there is no text to be extracted from the display item, the text determination unit 140 may determine a text by coupling the pre-stored text (e.g. number, alphabet, etc.) to the display item. For instance, it may be determined by coupling a first display item to the text "1" and by coupling a second display item to the text "2".

If more than one display item is present, the text determination unit 140 extracts a different text for each of the display items so a user can utter the text corresponding to the display item he/she wishes to execute without also selecting another display item.

The voice recognition unit 150 recognizes a voice input spoken by the user and outputs a recognized voice input as text information. More specifically, the voice recognition unit 150 analyzes the waveform formed by the voice characteristic of the user (that is, a voice's characteristic vector), identifies a word or a word line corresponding to the voice input spoken by the user, and outputs the recognized voice input as text information. The user's voice is input through a microphone, which can be embedded in the display apparatus 100 or connected to the display apparatus 100 (by a wired connection, or wireless connection, through a network, etc.).

Although the voice recognition unit 150 is shown in FIG. 1 as part of the display apparatus 100, this is merely an example and the voice recognition may be performed by an external device connected to the display apparatus 100 through a wired connection, through a wireless connection, through a network, etc.

For example, the voice recognition unit 150 may be realized by an external voice input apparatus such as a smart phone, a tablet PC, or a remote controller with a microphone therein. More specifically, the voice recognition unit 150 recognizes the voice input spoken by the user through the external voice input apparatus, converts the voice into text information, and transmits the recognized voice input to the display apparatus 100. As stated above, the external voice input apparatus and the display apparatus 100 may exchange the text information with each other using a network such as Wi-Fi or Bluetooth.

The database 160 stores the library dictionary to extract meaningful keywords. Also, the database 160 matches a recognized voice input with a similar text which is similar to the recognized text in pronunciation, and stores the recognized voice input with the similar text associated with the recognized voice input.

The GUI generation unit 170 generates a GUI to be provided for the user. The GUI generation unit 170 may generate a user menu in the form of an on-screen display (OSD).

The controller 180 controls overall operations of the display apparatus 100 according to the user manipulation.

In particular, the controller 180 may control the display unit 130 to display the text extracted from the link included in the displayed user interface to be distinguished from the other texts.

More specifically, if the user interface is displayed, the controller 180 controls the text determination unit 140 to extract the texts of the plurality of links included in the displayed user interface. If the texts of the plurality of links are extracted, the controller 180 controls the display unit 130 to distinguish the extracted texts from the other texts. The controller 180 may display the extracted texts to be distinguished from the other texts using at least one of color, font, thickness and underline of the text.

If the user utters one of the extracted texts, and the voice recognition unit 150 recognizes the voice input, the controller 180 may match the recognized voice input with the extracted text and execute the link associated with the matched text.

Figure 2:
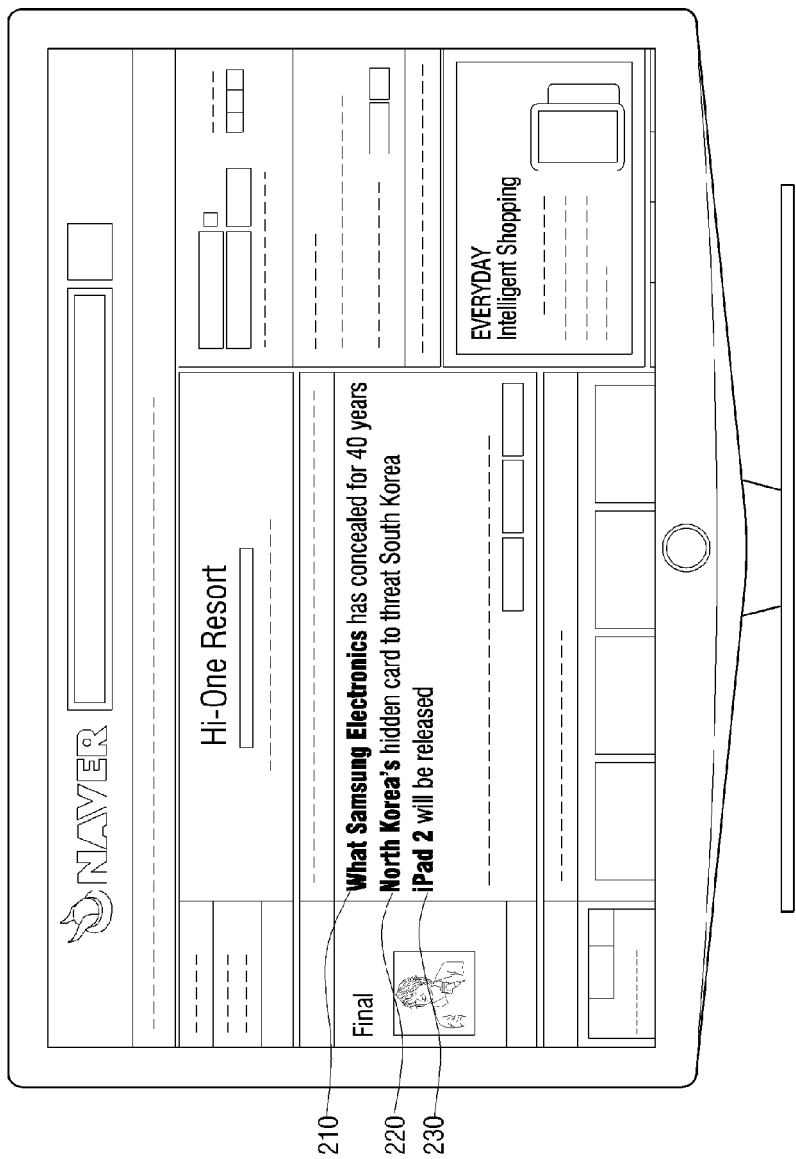
FIGS. 2 to 4 are views to explain a graphic user interface (GUI) to execute a link according to exemplary embodiments.

For example, as shown in FIG. 2, the display unit 130 displays a user interface comprising the plurality of links. The plurality of links comprises "What Samsung Electronics has concealed for 40 years" 210, "North Korea's hidden card to threat South Korea" 220, and "iPad 2 will be released" 230.

If the user interface is displayed, the controller 180 extracts texts "Samsung Electronics", "North Korea" and "iPad 2", which are distinguishable words, from the text information of the plurality of links 210, 220, and 230 included in the displayed user interface. If the texts are extracted, as shown in FIG. 2, the controller 180 may highlight the texts, "Samsung Electronics", "North Korea", and "iPad2", of the texts of the plurality of links 210, 220, and 230 in bold to be distinguished from the other texts. Accordingly, if the voice recognition unit 150 recognizes one of the texts "Samsung Electronics", "North Korea", and "iPad 2", the controller 180 may execute the link comprising the recognized text. For example, if the voice recognition unit 150 recognizes "Samsung Electronics" from the voice input spoken by the user, the controller 180 executes the link 210, "What Samsung Electronics has concealed for 40 years."

Although the texts extracted by the controller 180 are distinguished from the other texts in thickness in FIG. 2, this is merely an example. The controller 180 may display the extracted texts to be distinguished from the other texts using at least one of color, font, underline, etc.

Also, the controller 180 may control the display unit 130 to display an icon comprising information indicating that voice recognition is possible on one side of the extracted text.

Figure 3:
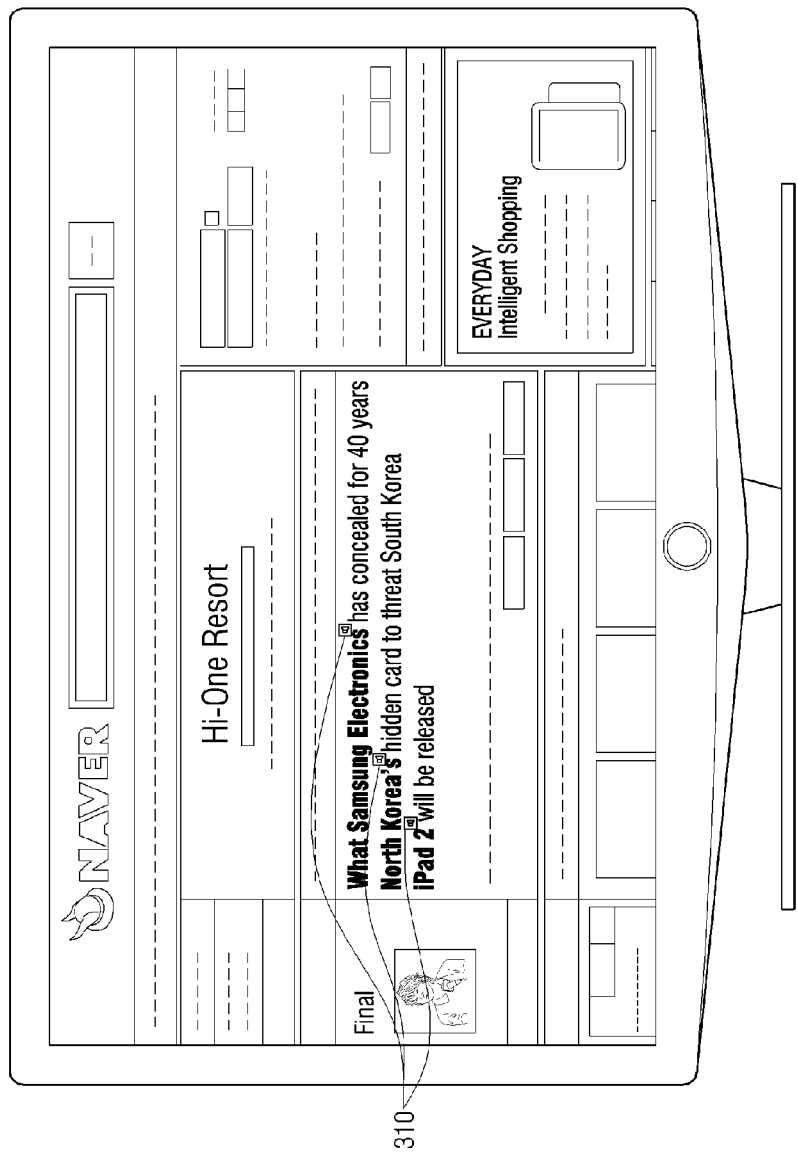

For example, as shown in FIG. 3, the controller 180 may control the display unit 130 to display an icon 310 comprising information indicating that voice recognition is possible on the right upper end of each of the extracted texts "Samsung Electronics", "North Korea", and "iPad 2". The shape of the icon 310 shown in FIG. 3 is merely an example and the technical idea of the present disclosure can be applied to any visual indication that can indicate that voice recognition is possible.

As shown in FIG. 3, the icon 310 indicating that the voice recognition is possible is also displayed so that the user can more exactly know which word he/she should utter in order to execute a link.

Also, if an image link without text information is displayed on the user interface, the controller 180 may display a specific text on one side of the image link. If the specific text is uttered through the voice recognition unit 150, the controller 180 may execute the image link corresponding to the specific text.

Figure 4:
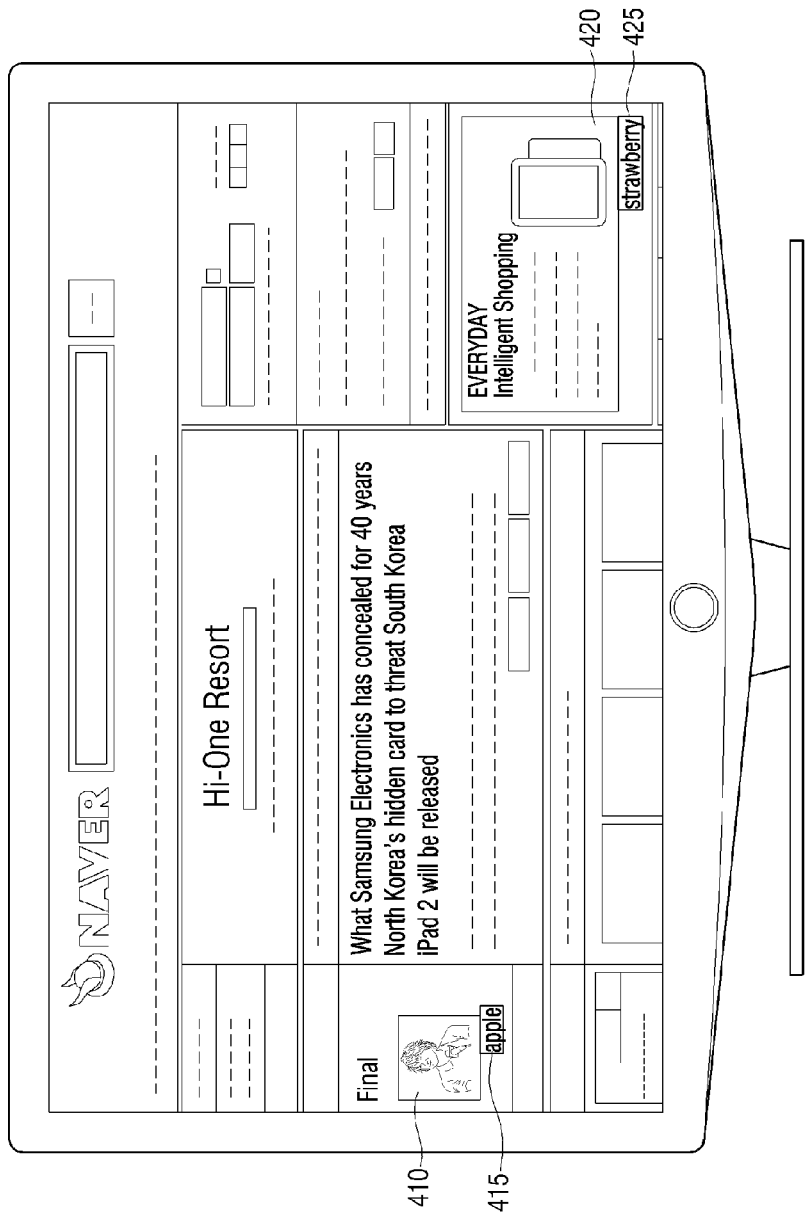

For example, as shown in FIG. 4, the display unit 130 displays the user interface comprising a plurality of image links. The plurality of image links comprises a first image link 410 displayed on the left, and a second image link 420 displayed on the right.

If the user interface is displayed, as shown in FIG. 4, the controller 180 adds specific texts "Apple" and "Strawberry" to the plurality of image links 410 and 420 included in the displayed user interface and displays the specific texts on the right lower end of each image link. The specific text is an arbitrary text added to recognize the image link. If one of "Apple" and "Strawberry" is recognized by the voice recognition unit 150, the controller 180 may execute the image link comprising the recognized specific text. For example, if the voice recognition unit 150 recognizes "Apple" from a voice input spoken by the user, the controller 180 executes the first image link 410.

As shown in FIG. 4, the specific text is added to the image link without text information so that the image links can also be executed through voice recognition.

On the other hand, if the recognized voice input does not match one of the extracted texts, the controller 180 may inform the user by displaying the recognized voice input.

Meanwhile, the above-described exemplary embodiments describe the method for executing a link included in a user interface. However, this is merely an example, and an application of a technical concept of the present disclosure is possible to execute another display item. For example, the technical concept of the present disclosure can be applied to execute an application included in a content list, an icon included on a user desktop, or any other visual indicator capable of being selected by a user.

Figure 5:
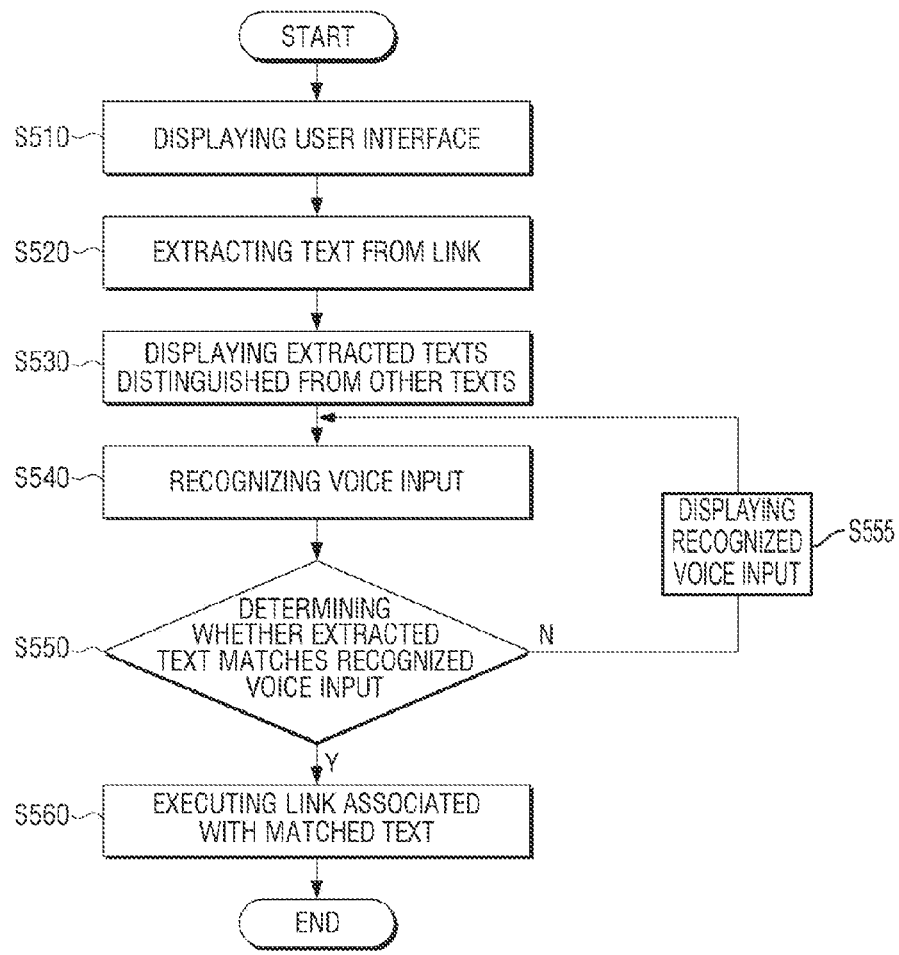
FIG. 5 is a flowchart illustrating a method for executing a link according to exemplary embodiments.

Hereinafter, a method for executing a link of the display apparatus 100 according to exemplary embodiments will be explained with reference to FIG. 5.

First, the display apparatus 100 displays a user interface (S510), for example, a web page downloaded through an Internet connection.

The display apparatus 100 determines a text of a link included in the user interface (S520). At this time, the display apparatus 100 extracts the text of the link included in the user interface and determines the text corresponding to the link. If a plurality of links is included in the user interface, the display apparatus 100 determines texts such that the texts of the plurality of links do not overlap (i.e. share common words) with one another.

If the text is determined, the display apparatus 100 displays the determined text in a manner which distinguishes it from the other texts (S530). For example, the display apparatus 100 highlights the determined text in bold type, changes color or font of the text, underlines the text, etc.

Alternatively, the display apparatus 100 may display an icon indicating that voice recognition is possible on one side of the determined text.

If the determined text is displayed in a manner which distinguishes it the other texts, the display apparatus 100 recognizes a user's voice through a voice recognition apparatus (S540). The voice recognition apparatus may be a microphone that is embedded in the display apparatus 100 or connected to the display apparatus 100 (through a wired connection, a wireless connection, a network connection, etc.). However, this is merely an example and the voice input spoken by the user may be recognized by an external voice recognition apparatus such as a smart phone.

The display apparatus 100 determines whether an extracted text matches a recognized voice input (S550). If there an extracted text matches a recognized voice input (S550-Y), the display apparatus 100 executes the link associated with the matched text (S560).

However, if there is no text matched with the recognized voice (S550-N), the display apparatus 100 displays the recognized voice input (operation 5555) and continues voice recognition (i.e. repeats operation 5540) in order to repeatedly determine whether a recognized voice input matches with an extracted text. Once there is a text matched with the recognized voice (S550-Y), the display apparatus 100 executes the link including the matched text (S560).

As described above, the extracted text is distinguishably displayed before the user inputs a voice command so that the display apparatus 100 can provide more exact voice recognition.

Figure 6:
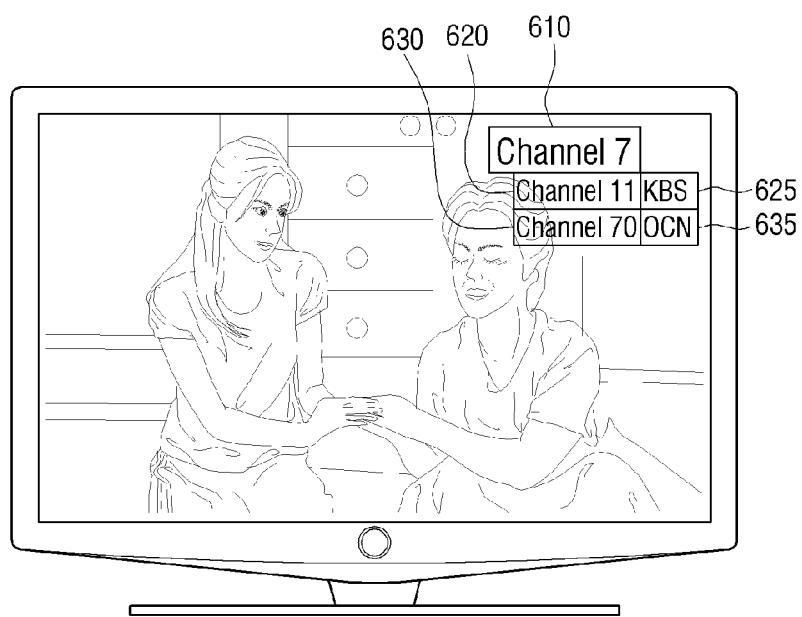
FIGS. 6 to 8 are views to explain a GUI to prevent misrecognition by providing a similar text according to exemplary embodiments.
Figure 7:
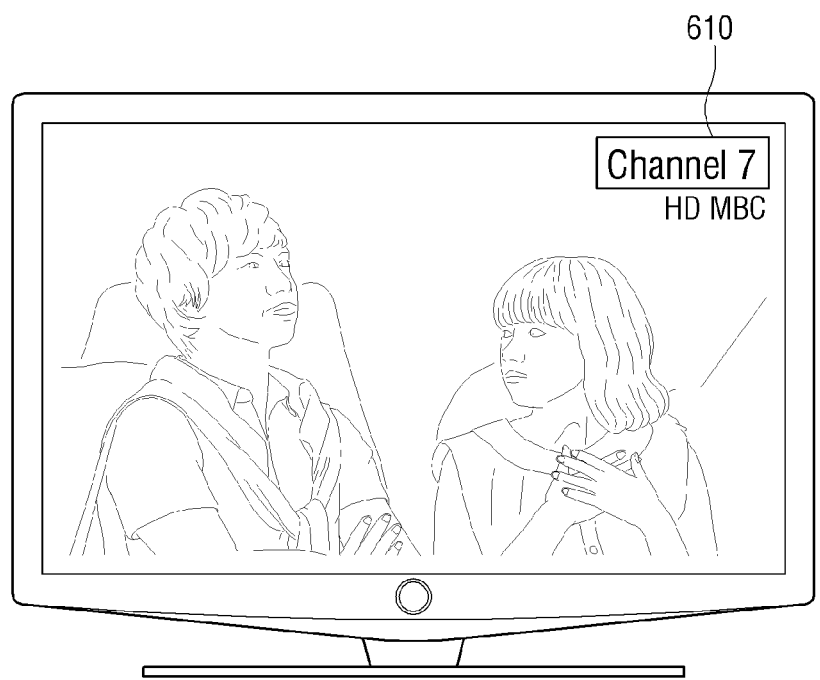
Figure 8:
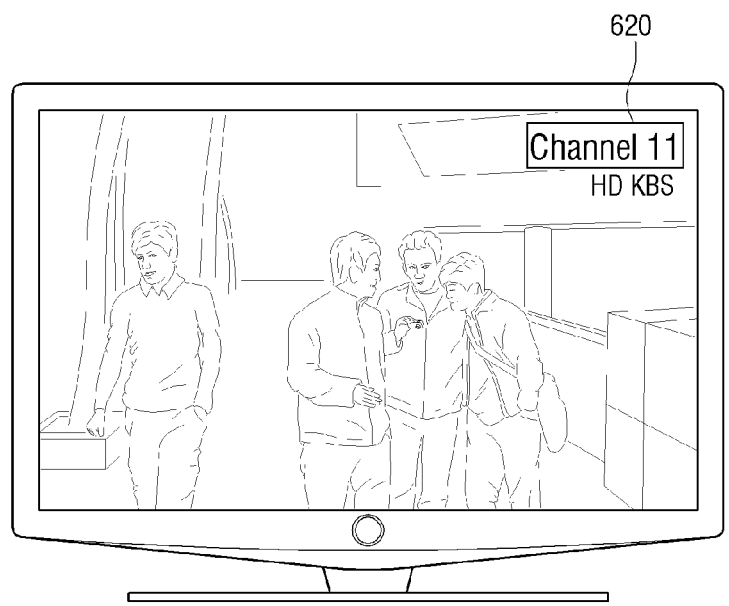

Hereinafter, a method for recognizing a voice in which the display apparatus 100 provides a similar text in order to prevent misrecognition will be explained with reference to FIGS. 6 to 8. Since the display apparatus 100 to be explained with reference to FIGS. 6 to 8 is the same as in FIG. 1, a detailed explanation is omitted.

If a voice input by the user is recognized by the voice recognition unit 150, the controller 180 searches a text matching the recognized voice input. If text matching the recognized voice input is found, the controller 180 may also retrieve similar text from database 160 and search for the similar text. Similar text is similar in pronunciation, and is associated with matched text and stored in the database 160. Similar text may be set at the time that the display apparatus 100 is manufactured and may be updated by user input.

If the matched text and the similar text are searched, the controller 180 controls the display unit 130 to display the similar text along side the matched text.

For example, if the voice recognition unit 150 recognizes the word "seven" spoken by the user, the controller 180 searches "seven." The controller 180 also searches similar texts "eleven" and "seventy," which are similar to "seven" in pronunciation.

If the matched text and the similar texts are searched, the controller 180 displays a "channel 7" icon 610 corresponding to the matched text "seven" on the right upper end of a screen, as shown in FIG. 6. Also, the controller 180 displays "channel 11" and "channel 70" icons 620 and 630 corresponding the similar words "eleven" and "seventy" under the "channel 7" icon 610.

The controller 180 displays identification texts 625 and 635 on the right side of the similar texts 620 and 630. The identification texts correspond to the similar texts and are different from the similar text in pronunciation.

For example, the identification text 625, "KBS", is displayed on the right of the "channel 11" icon 620 and the identification text 635, "OCN", is displayed on the right of the "channel 70" icon 630.

The identification texts are displayed to allow the user to select one of the similar texts rather than the voice input recognized by the voice recognition unit 150 and matched by controller 180.

For example, the controller 180 may determine whether there is additionally recognized voice input from the user for a predetermined time (for example, 2 seconds), and select either the matched text or one of the similar text.

More specifically, if there is no additional voice recognition from the user within the predetermined time, the controller 180 recognizes and selects the matched text. For example, if there is no additional voice recognition from the user within the predetermined time in the example of FIG. 6, the controller 180 recognizes that "channel 7" is correct and controls the display unit 130 to tune to channel 7 and display it as shown in FIG. 7.

However, if there is additionally recognized voice input within the predetermined time, the controller 180 determines whether the additionally recognized voice input by the user is matched with the identification text displayed on one side of the similar text. For example, if there is additionally recognized voice input within the predetermined time in the example shown in FIG. 6, the controller 180 determines whether the additionally recognized voice input is "KBS" or "OCN". If the user says "KBS" within the predetermined time, the controller 180 recognizes "KBS" and selects "channel 11" as shown in FIG. 8.

As explained above in FIGS. 6-8, the matched text and the similar text are provided so that misrecognition of the voice input can be prevented.

Figure 9:
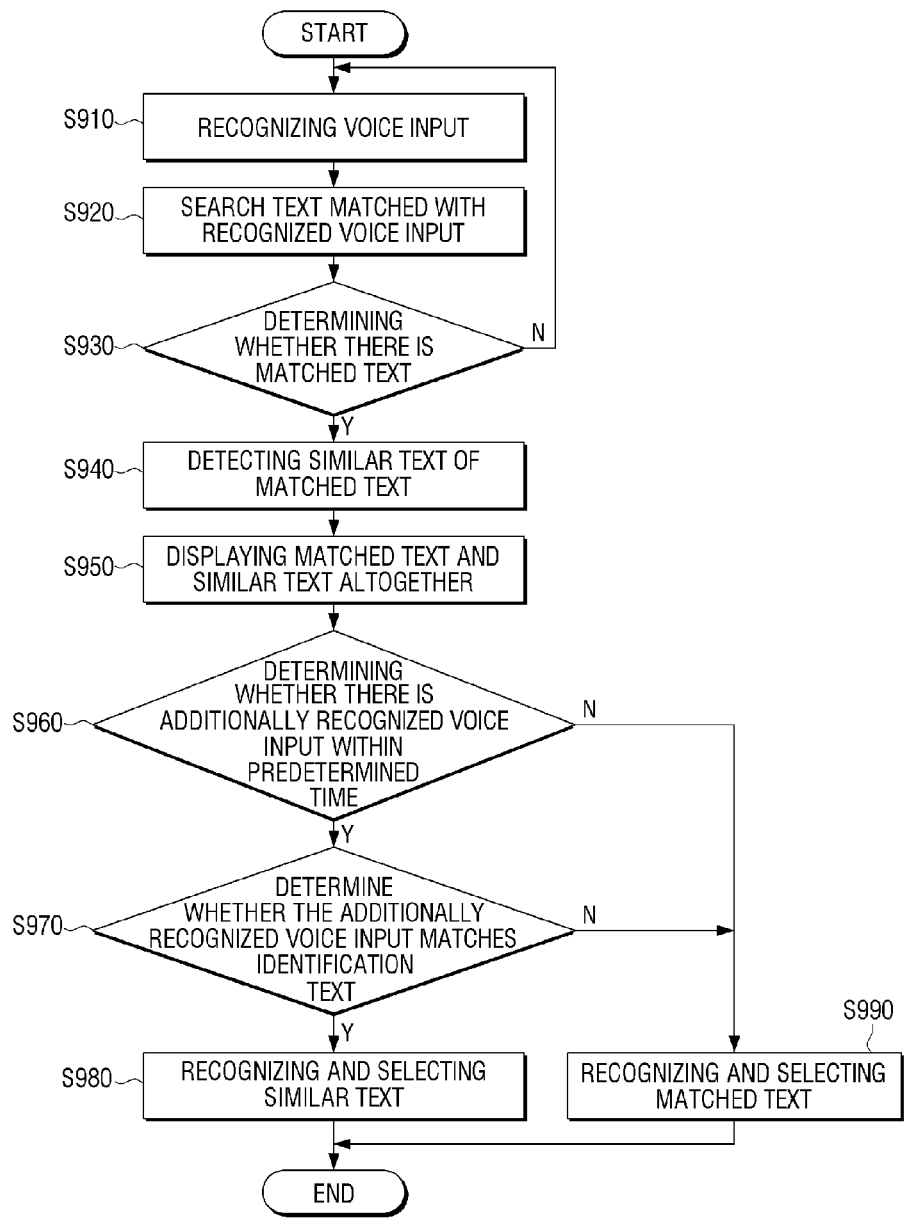
FIG. 9 is a flowchart illustrating a method for recognizing a voice according to exemplary embodiments.

Hereinafter, a method for recognizing a voice input of the display apparatus 100 according to exemplary embodiments will be explained with reference to FIG. 9.

First, the display apparatus 100 recognizes a voice input spoken by a user through a voice recognition apparatus (S910). The voice recognition apparatus may be a microphone embedded in the display apparatus 100 or connected to the display apparatus 100 (through a wired connection, a wireless connection, or a network connection). However, this is merely an example and the voice uttered by the user may be recognized using an external voice recognition apparatus such as a smart phone.

The display apparatus 100 searches a text matched with the recognized voice input (S920). If there is a text matched with the uttered voice (S930-Y), the display apparatus 100 detects a text that is similar to the matched text (S940). The similar text is a text that is similar to the matched text in pronunciation, and the database 160 pre-stores similar texts associated with matched text. Similar text may be set at the time that the display apparatus 100 is manufactured and may be updated by user input.

If the matched text and the similar text are searched, the display apparatus 100 displays the matched text and the similar text (S950) altogether. For example, as shown in FIG. 6, the display apparatus 100 displays the text matched with the voice uttered by the user on the right upper end of the display screen and displays the similar text under the matched text.

At this time, the display apparatus 100 may display an identification text, which is different from the similar text in pronunciation, on one side of the similar text in order to guarantee more exact voice recognition.

If the matched text, the similar text, and the identification text are displayed, the display apparatus 100 determines whether there is additionally recognized voice input from the user within a predetermined time (S960). The predetermined time may be 2 seconds. However, this is merely an example and the predetermined time may be another time and may be set by the user.

If there is no additionally recognized voice input from the user with the predetermined time (S960-N), the display apparatus 100 recognizes and selects the matched text (S990). That is, if there is no additionally recognized voice input from the user within the predetermined time, the display apparatus 100 determines that the voice input from the user is matched with the text the user wishes to select the matched text rather than the similar text.

However, if there is additionally recognized voice input from the user within the predetermined time (S960-Y), the display apparatus 100 determines whether the additionally recognized voice input is matched with the identification text (S970). If the additionally recognized voice input matched with the identification text, the display apparatus 100 recognizes and selects the similar text corresponding to the identification text (S980). That is, the display apparatus 100 determines that the voice input first uttered by the user is wrongly recognized and selects and the similar text corresponding to the additionally recognized identification text.

If the voice input additionally recognized within the predetermined time is not matched with the identification text (S970-N), the display apparatus 100 recognizes and selects the matched text (S990).

However, this is merely an example, and, if additionally recognized voice input of the user is not matched with the identification text within the predetermined time, the display apparatus 100 may continue to determine whether there is additional voice input.

As described above, the text primarily matched with the voice uttered by the user and the similar text are displayed altogether so that misrecognition of voice input can be prevented.

Also, in addition to the exemplary embodiments above, the technical idea of voice recognition method included in the present disclosure can be applied to any voice recognition method that can recognize a voice uttered by a user.

Hereinafter, referring to FIGS. 10 to 13, a voice recognition method by coupling a text to a display item is described according to exemplary embodiments. A configuration of the display apparatus 100 illustrated in FIGS. 10 to 13 is the same as that illustrated in FIG. 1, and thus detailed description is omitted.

Figure 10:
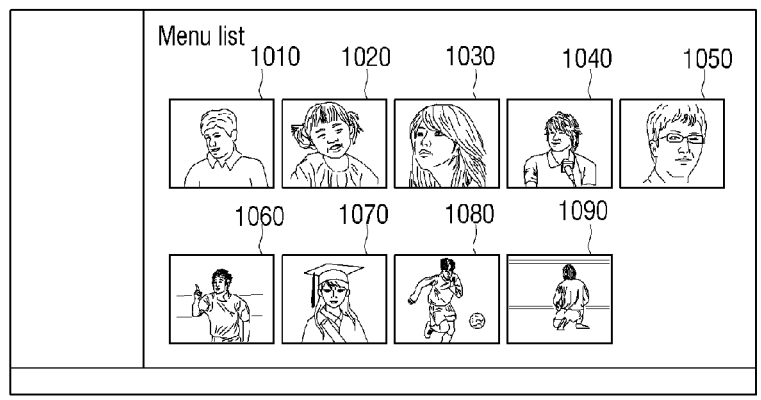
FIGS. 10 to 13 are views to explain a GUI to prevent misrecognition by coupling a display item to a text according to exemplary embodiments.

Specifically, as illustrated in FIG. 10, in case that there is no text to be extracted from a plurality of menu items 1010 to 1090 included in a menu list (for example, in case where links are image-only and include no text), if a specific voice command is input by the user and recognized by the voice recognition unit 150, the controller 180 controls the text determination unit 140 so that the text determination unit 140 determines a plurality of texts (e.g. a number, a letter of the alphabet, a Roman character, etc.) corresponding respectively to the plurality of menu items 1010 to 1090.

Menu items may be assigned a number or a letter of the alphabet in the order that the menu items are displayed. The controller 180 may determine a plurality of texts so that the plurality of texts 1110 to 1190 coupled to the plurality of menu items 1010 to 1090 do not overlap (i.e. share common words) with each other.

Figure 11:
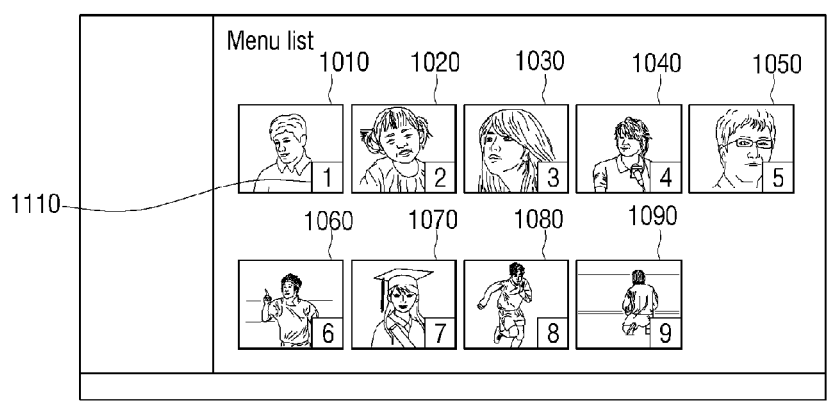

The controller 180 displays the plurality of texts 1110 to 1190 coupled to the plurality of menu items 1010 to 1090 so that the plurality of menu items 1010 to 1090 may be distinguished from each other. For example, as illustrated in FIG. 11, the controller 180 assigns texts "1" through "9" in the order that the menu items are displayed so that the plurality of menu items 1010 to 1090 may be distinguished from each other, and displays the texts on one side of the display items. For example, the numbers "1" through "9" when displayed as texts may be surrounded by a circle or box.

If the voice recognized by the voice recognition unit 150 corresponds to the first text 1110, the controller 180 may select the first menu item 1010 corresponding to the first text 1110. Specifically, if the voice recognition unit 150 recognizes a voice input of "1" from the user, the controller 180 selects the first menu item 1010 which is a menu item corresponding to the recognized "1", and thus may execute the first menu item 1010.

Figure 12:
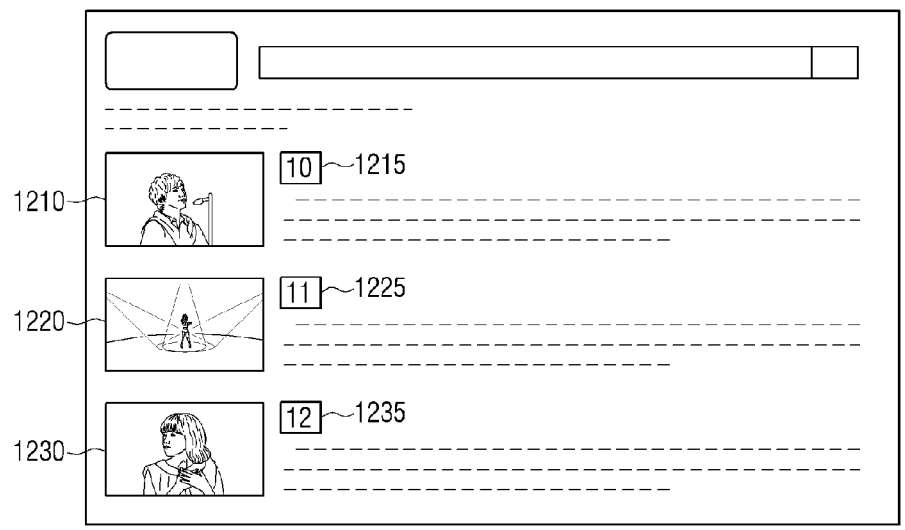
Figure 13:
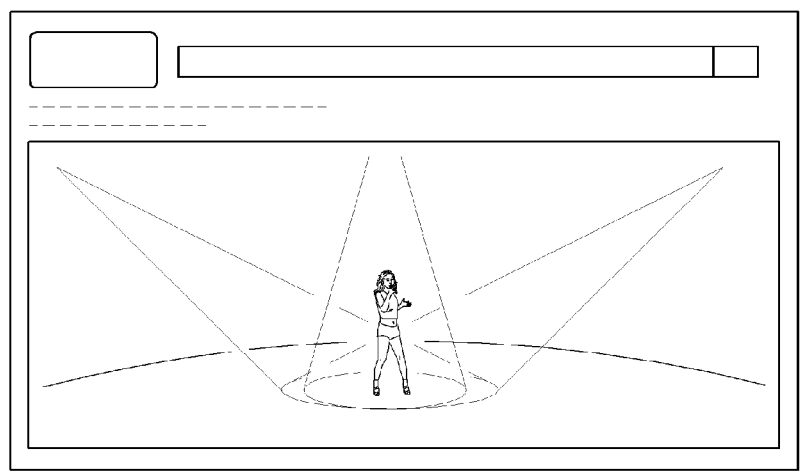

FIGS. 12 and 13 are views to explain an example that a display item is a link according to other exemplary embodiments.

The controller 180 determines a plurality of texts 1215, 1225, 1235 corresponding to a plurality of links 1210, 1220, 1230 included in a user interface (such as a web page), and as illustrated in FIG. 12, may couple the plurality of links 1210, 1220, and 1230 to the plurality of texts 1215, 1225, and 1235, respectively, and display the plurality of texts, 1215, 1225, and 1235 alongside the plurality of links 1210, 1220, and 1230, respectively.

If a voice input from a user corresponding to a specific text is recognized by the voice recognition unit 150, the controller 180 executes a link corresponding to the recognized text. For example, if the voice input "12" is recognized by the voice recognition unit 150, the controller 180, as illustrated in FIG. 13, executes a third link 1230 corresponding to a third text 1235 which is "12".

Figure 14:
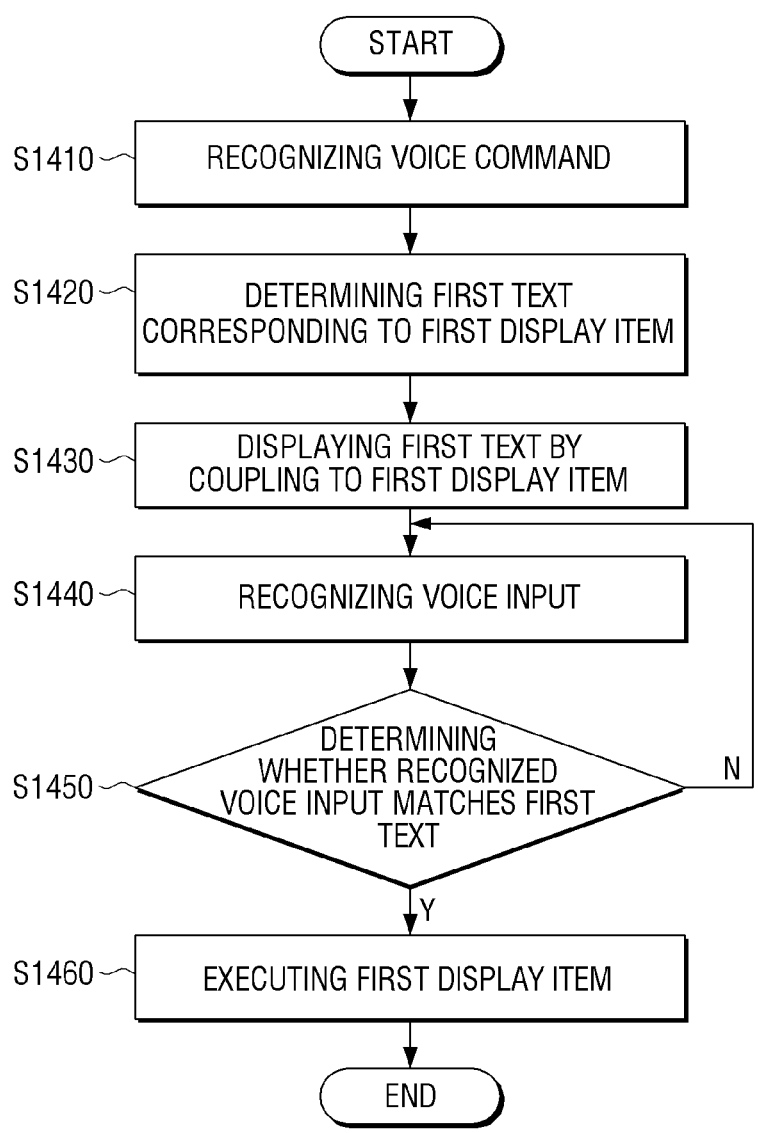
FIG. 14 is a flowchart illustrating a method for recognizing a voice according to other exemplary embodiments.

Hereinafter, referring to FIG. 14, a voice recognition method by coupling a display item to a text is described.

First, the display apparatus 100 recognizes a voice command which is pre-programmed to couple the display item to the text through the voice recognition unit 150 (S1410). Any voice command can be pre-programmed. For instance, the voice command may be "Activate voice recognition".

The display apparatus 100 determines a first text corresponding to a first display item (S1420). The display item may be a menu item, an application item a link, etc., and the text may be a number, a letter of the alphabet, a Roman character, etc. Display items may be assigned numbers or letters of the alphabet in the order that the display items are displayed. The display apparatus 100 may determine a plurality of texts so that the plurality of texts coupled to a plurality of display items do not overlap (i.e. share common words) with each other.

The display apparatus 100 couples the first text to the first display item and displays the first text alongside the first display item (S1430). For example, the first text may be distinguished from other text, for instance by being surrounded by a circle or box.

The display apparatus 100 recognizes a user voice input

The display apparatus 100 determines whether the recognized voice input matches the first text (S1450).

If the recognized voice input matches the first text, the display apparatus 100 executes the first display item corresponding to the first text (S1460).

By the above-described method, a display item may be executed by voice recognition even when there is no text to be extracted from the display item.

Meanwhile, display apparatus 100 may be any apparatus which includes user interface. For example, the display apparatus 100 may be a computer, a television, a portable media player (PMP), a smart phone, etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A voice recognition method for a display apparatus, the method comprising:
    determining a first text extracted from a first display item;
    displaying the first text so as to distinguish the first text from other texts;
    recognizing a voice input from a user;
    determining if the recognized voice input corresponds to the first text; and
    selecting the first display item in response to a determination that the recognized voice input corresponds to the first text,
    wherein the voice input comprises a voice of the user speaking at least a word from the first text, and
    wherein the determining a first text corresponding to a first display item comprises extracting the first text comprising at least one word from the display item such that the first text does not share common words with a second text extracted from a second display item.

2. The method of claim 1, wherein the first text comprises at least one of among a partial text included in the first display item and a related text of the first display item.

3. The method of claim 1, wherein the first display item comprises a link.

4. The method of claim 1, wherein the first text is displayed to be distinguished from the other texts using at least one of among color, font, thickness, and underline.

5. The method of claim 1, wherein the first text is processed to be distinguished from the other texts using a visual indication that voice recognition is possible.

6. The method of claim 1, wherein the first display item comprises a result of a search using a search engine.

7. The method of claim 1, wherein the first display item comprises a hyperlink and the selecting the first display item comprises displaying a web page linked to the first display item.

8. The method of claim 1, further comprising, displaying the recognized voice input in response to a determination that the recognized voice input does not correspond to the first text.

9. The method of claim 1, wherein the other texts comprise texts included in the first display item except for the first text.

10. The method of claim 1, wherein the first text is determined by an order that words included in the first display item are listed.

11. The method of claim 1, wherein the first text is determined by an analysis of meanings of the words included in the first display item.

12. The method of claim 1, wherein the first text is processed by sound to be distinguished from the other texts.

13. The method of claim 1, wherein the selecting the first display item comprises displaying a screen resulting from performing a function associated with the first display item.

14. A display apparatus comprising:
    a display unit which displays a first display item;
    a text determination unit which extracts a first text from the first display item;
    a voice recognition unit which recognizes a voice input from a user; and
    a controller which:
        displays the first text so as to distinguish the first text from other texts,
        determines if the recognized voice input corresponds to the first text, and
        controls the display unit to select the first display item in response to a determination that the recognized voice input corresponds to the first text,
    wherein the voice input comprises a voice of the user speaking at least a word from the first text, and
    wherein the text determination unit extracts the first text comprising at least one word from the display item such that the first text does not share common words with a second text extracted from a second display item.

15. The display apparatus of claim 14, wherein the first text comprises at least one of among a partial text included in the first display item and a related text of the first display item.

16. The display apparatus of claim 14, wherein the display item comprises a link.

17. The display apparatus of claim 14, wherein the first text is distinguished from the other texts using at least one of among color, font, thickness, and underline.

18. The display apparatus of claim 14, wherein the first text is distinguished from the other texts using a visual indication that voice recognition is possible.

19. The display apparatus of claim 14, wherein the first display item comprises a result of a search using a search engine.

20. The display apparatus of claim 14, wherein the first display item comprises a hyperlink and the selecting the first display item comprises displaying a web page linked to the first display item.

21. The display apparatus of claim 14, wherein the controller displays the recognized voice input in response to a determination that the recognized voice input does not match the first text.

22. The display apparatus of claim 14, wherein the other texts comprise texts among the texts included in the first display item except for the first text.

23. The display apparatus of claim 14, wherein the first text is determined by an order that words included in the first display item are listed.

24. The display apparatus of claim 14, wherein the first text is determined by an analysis of meanings of the words included in the display item.

25. The display apparatus of claim 14, wherein the first text is processed by sound to be distinguished from the other texts.

26. The display apparatus of claim 14, wherein the selecting the first display item comprises displaying a screen resulting from performing a function associated with the first display item.

27. A method for executing a link of a display apparatus, the method comprising:
   displaying a user interface;
   determining a first text included in a first link included in the user interface;
   displaying the first text so as to distinguish the first text from other texts;
   recognizing a voice input from a user;
   determining if the recognized voice input matches the first text; and
   executing the first link in response to a determination that the recognized voice input matches the first text,
   wherein the voice input comprises a voice of the user speaking at least a word from the first text, and
   wherein the determining a first text comprises extracting a first text comprising at least one word from the first link such that the first text does not share common words with a second text determined in a second link.

28. The method of claim 27, wherein the displaying comprises displaying the first text in a manner distinguished from the other texts using at least one of among color, font, thickness, and underline.

29. The method of claim 28, wherein the displaying comprises displaying a visual indication that voice recognition is possible on one side of the first text.

30. The method of claim 27, further comprising, if a link displayed as an image is included in the user interface, determining a specific text corresponding to the link displayed as the image; and
   displaying the specific text on one side of the link displayed as the image,
   wherein the executing comprises executing the link displayed as the image in response to a determination that the recognized voice input matches the specific text.

31. The method of claim 27, wherein the recognizing a voice input comprises receiving and recognizing voice information of the user by an external voice recognition apparatus comprising a microphone.

32. A display apparatus comprising:
   a display unit which displays a user interface;
   a text determination unit which determines a first text included in a first link included in the user interface;
   a voice recognition unit which recognizes a voice input from a user; and
   a controller which:
      controls the display unit to display the first text so as to distinguish the first text from other texts,
      determines if the recognized voice input matches the first text, and
      executes the first link in response to a determination that the recognized voice input matches the first text,
   wherein the voice input comprises a voice of the user speaking at least a word from the first text, and
   wherein the text determination unit extracts the first text comprising at least one word from the first link such that the first text does not share common words with a second text determined in a second link.

33. The display apparatus of claim 32, wherein the controller controls the display unit to display the first text in a manner distinguished from the other texts using at least one of among color, font, thickness, and underline.

34. The display apparatus of claim 33, wherein the controller controls the display unit to display a visual indication that voice recognition is possible on one side of the first text.

35. The display apparatus of claim 32, wherein, if a link displayed as an image is included in the user interface, the controller controls the display unit to determine a specific text corresponding to the link displayed as the image, and to display the specific text on one side of the link displayed as the image, and executes the link displayed as the image in response to a determination that the recognized voice input matches the specific text.

36. The display apparatus of claim 32, wherein the voice recognition unit comprises an external voice recognition apparatus comprising a microphone.

37. A voice recognition method for a display apparatus, the method comprising:
   recognizing a voice input from a user;
   determining if the voice input from the user is recognized, searching a text matched with the recognized voice input;
   displaying the matched text and a similar text of the matched text on one side of the matched text; and
   selecting one of the matched text and the similar text according to additionally recognized voice input from the user,
   wherein the voice input comprises a voice of the user speaking at least a word from the first text.

38. The method of claim 37, wherein the selecting comprises:
   determining if there is an additionally recognized voice input from the user within a predetermined time, and
   selecting the matched text in response to a determination that there is no additionally recognized voice input from the user within the predetermined time.

39. The method of claim 37, wherein the displaying comprises displaying identification text on one side of the similar text,
   wherein the identification differs from the matched text in pronunciation.

40. The method of claim 39, wherein the selecting comprises:
   determining if an additionally recognized voice input from the user matches the identification text, and
   selecting the similar text in response to a determination that the additionally recognized voice input matches the identification text.

41. The method of claim 37, wherein the displaying further comprises:
   detecting the similar text from a database in which similar texts are associated with matched text and recorded,
   wherein the database is updatable.

42. A display apparatus comprising:
   a display unit;
   a voice recognition unit which recognizes a voice input from a user; and
   a controller which:
      determines if the voice input from the user is recognized, searches a text matched with the recognized voice input,
      controls the display unit to display the matched text and a similar text of the matched text on one side of the matched text, and selects one of among the matched text and the similar text according to additionally recognized voice input from the user, wherein the voice input comprises a voice of the user speaking at least a word from the first text.

43. The display apparatus of claim 42, wherein the controller:

determines if there is additionally recognized voice input from the user within a predetermined time, and selects the matched text in response to a determination that there is no additionally recognized voice input from the user within the predetermined time.

44. The display apparatus of claim 42, wherein the controller controls the display unit to display identification text on one side of the matched text, wherein the identification text differs from the matched text in pronunciation.

45. The display apparatus of claim 44, wherein the controller:

determines if additionally recognized voice input from the user is matched the identification text, and selects the similar text in response to a determination that the additionally recognized voice input from the user matches the identification text.

46. The display apparatus of claim 45, further comprising a database in which similar texts are associated with matched text and recorded, wherein the database is updatable.

47. A voice recognition method for a display apparatus, the method comprising:

determining a first text corresponding to a first display item;

coupling the first text to the first display item;

displaying the first text so as to distinguish the first display item from a second display item;

recognizing a voice input from a user;

determining if the recognized voice input corresponds to the first text; and selecting the first display item in response to a determination that the recognized voice input corresponds to the first text, wherein the voice input comprises a voice of the user speaking at least a word from the first text, and wherein the determining the first text comprises extracting the first text comprising at least one word from the first display item such that the first text does not share common words with a second text coupled to the second display item.

48. The method of claim 47, wherein the first text comprises at least one of among a number, a letter of the alphabet, a Roman character, a partial text included in the first display item, and a related text of the first display item.

49. The method of claim 47, wherein the first display item comprises at least one of among a menu item, an application icon, and a link.

50. The method of claim 47, wherein the first text is displayed surrounded by one of among a circle and a box.

51. The method of claim 47, wherein the first display item comprises a result of a search using a search engine.

52. The method of claim 47, wherein the first display item comprises a hyperlink, and the selecting the first display item comprises displaying a web page linked to the first display item.

53. The method of claim 47, wherein the selecting the first display item comprises displaying a screen resulting from performing a function associated with the first display item.

54. A display apparatus comprising:

a display unit which displays a first display item;

a text determination unit which determines a first text corresponding to the first display item;

a voice recognition unit which recognizes a voice input from a user; and a controller which:

couples the first text to the first display item, displays the first display item so as to distinguish the first display item from a second display item, determines if the recognized voice input corresponds to the first text, and selects the first display item in response to a determination that the recognized voice input corresponds to the first text, wherein the voice input comprises a voice of the user speaking at least a word from the first text, and wherein the determining the first text comprises extracting the first text comprising at least one word from the first display item such that the first text does not share common words with a second text coupled to the second display item.

55. The display apparatus of claim 54, wherein the first text comprises at least one of among a number, a letter of the alphabet, a Roman character, a partial text included in the first display item, and a related text of the first display item.

56. The display apparatus of claim 54, wherein the first display item comprises at least one of among a menu item, an application icon, and a link.

57. The display apparatus of claim 54, wherein the first text is displayed surrounded by one of among a circle and a box.

58. The display apparatus of claim 54, wherein the first display item comprises a result of a search using a search engine.

59. The display apparatus of claim 54, wherein the first display item comprises a link, and the selecting the first display item comprises displaying a web page linked to the first display item.

60. The display apparatus of claim 54, wherein the selecting the first display item comprises displaying a screen resulting from performing an operation associated with the first display item.

* * * * *